US010666903B1

(12) United States Patent
Wu et al.

(10) Patent No.: US 10,666,903 B1
(45) Date of Patent: *May 26, 2020

(54) COMBINING ENCODED VIDEO STREAMS (71) Applicant: Amazon Technologies, Inc., Seattle, WA (US)

(72) Inventors: Yongjun Wu, Bellevue, WA (US); Charles Benjamin Franklin Waggoner, Portland, OR (US); Patrik Schnell, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,337

(22) Filed: Jul. 15, 2019

Related U.S. Application Data (63) Continuation of application No. 15/872,263, filed on Jan. 16, 2018, now Pat. No. 10,397,518.

(51) Int. Cl.
| | |
|---|---|
| H04N 7/15 | (2006.01) |
| H04N 19/44 | (2014.01) |
| H04N 19/30 | (2014.01) |
| G10L 19/008 | (2013.01) |
| H04N 19/46 | (2014.01) |
| H04N 19/85 | (2014.01) |
| H04N 19/174 | (2014.01) |
| H04N 19/40 | (2014.01) |

(52) U.S. Cl.
CPC ............ H04N 7/15 (2013.01); G10L 19/008 (2013.01); H04N 19/174 (2014.11); H04N 19/30 (2014.11); H04N 19/40 (2014.11); H04N 19/44 (2014.11); H04N 19/46 (2014.11); H04N 19/85 (2014.11)

(58) Field of Classification Search
CPC combination set(s) only.
See application file for complete search history.

(56) References Cited

U.S. PATENT DOCUMENTS

| | | | |
|---|---|---|---|
| 9,392,303 B2* | 7/2016 | Yaron | ............ H04N 21/234363 |
| 2007/0188596 A1* | 8/2007 | Kenoyer | ........... H04L 29/06027 |
| | | | 348/14.08 |
| 2012/0063516 A1 | 3/2012 | Kwon et al. | |
| 2013/0343450 A1 | 12/2013 | Solka et al. | |
| 2016/0353133 A1 | 12/2016 | Davies | |
| 2016/0360154 A1 | 12/2016 | Talukder | |
| 2017/0200052 A1 | 7/2017 | Carey | |

(Continued)

OTHER PUBLICATIONS

U.S. Office Action dated Aug. 14, 2018 issued in U.S. Appl. No. 15/872,263.

(Continued)

Primary Examiner — Phung-Hoang J Nguyen
(74) Attorney, Agent, or Firm — Weaver Austin Villeneuve & Sampson LLP (57) ABSTRACT Techniques are described by which multiple, independently encoded video streams may be combined into a single decodable video stream. These techniques take advantage of existing features of commonly used video codecs that support the independent encoding of different regions of an image frame (e.g., H.264 slices or HEVC tiles). Instead of including different parts of the same image, each region corresponds to the encoded image data of the frames of one of the independent video streams.

17 Claims, 4 Drawing Sheets (56) References Cited

U.S. PATENT DOCUMENTS

2017/0272771 A1    9/2017   Edpalm
2018/0131980 A1    5/2018   Van der Schaar et al.
2018/0220166 A1*   8/2018   Meyer .............. H04N 21/64322
2018/0343492 A1*  11/2018   Konig ................ H04N 21/4355

OTHER PUBLICATIONS

U.S. Final Office Action dated Feb. 12, 2019 issued in U.S. Appl. No. 15/872,263.
U.S. Notice of Allowance dated May 2, 2019 issued in U.S. Appl. No. 15/872,263.
U.S. Appl. No. 15/872,263, filed Jan. 16, 2018, Wu et al.

* cited by examiner

COMBINING ENCODED VIDEO STREAMS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Communication over networks increasingly involves the transmission of video content. In cases in which a communication session includes more than two parties (e.g., online video conferencing), the end point devices with which participants connect to the session must be able to simultaneously decode and display multiple video streams. This requirement excludes the use of many of the connected devices by which people typically communicate.

DETAILED DESCRIPTION

This disclosure describes techniques by which multiple, independently encoded video streams may be combined into a single decodable video stream. These techniques take advantage of existing features of commonly used video codecs that support the independent encoding of different regions of an image frame. However, instead of these different regions (also referred to herein as "slices" or "tiles") including different parts of the same image, each region corresponds to the encoded image data of a frame of one of the independent video streams being combined. An example may be instructive.

Figure 1:
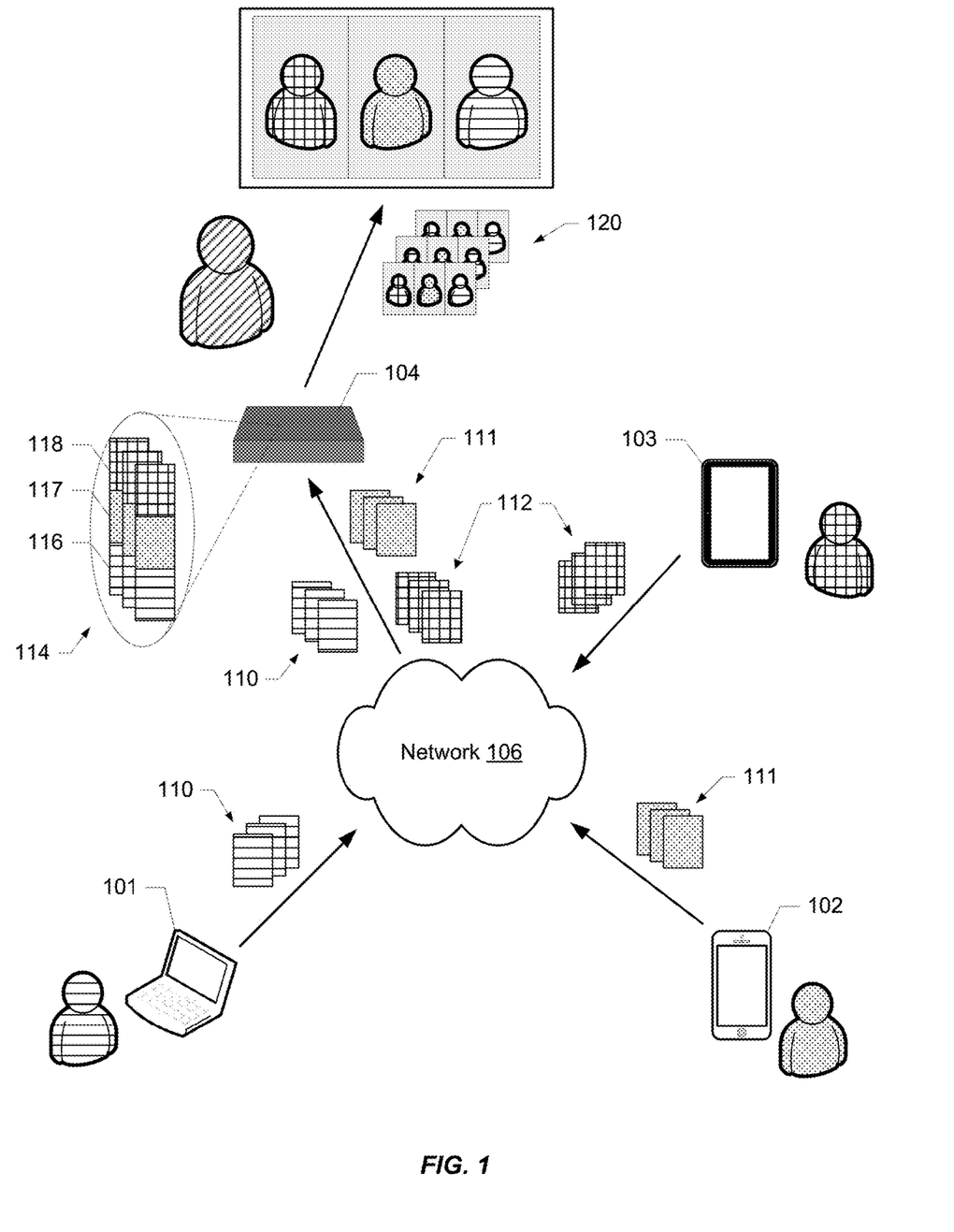
FIG. 1 illustrates an example of combining multiple video streams as enabled by the present disclosure.

FIG. 1 shows four client devices 101-104 engaged in a four-party video conference via network 106. Each of the client devices captures and encodes video of the associated participant for transmission to the other clients using the same encoding standard ("codec") such as, for example, the H.264 or MPEG-4 Part 10, Advanced Video Coding (MPEG-4 AVC) standard (referred to herein as H.264), or the H.265 or High Efficiency Video Coding standard (referred to herein as HEVC). The encoded video stream (e.g., 110-112) is then transmitted to each of the other participants. For clarity, FIG. 1 only depicts streams originating from three of the participants being combined for presentation to the fourth participant. As will be understood, this may be replicated for each participant and the content streams originating from the other three.

One of the characteristics of the H.264 standard is the capability of dividing the image of each frame into regions called slices that can be encoded and decoded independently of the other slices of the frame. Similarly, the HEVC standard includes the capability of dividing each frame image into independently encoded and decode tiles of varying size and arrangement. Conventionally, a frame might be encoded with multiple slices or tiles to promote parallel processing and/or error-resilience. The number and locations of the slices or tiles in each frame are communicated to the decoder in the metadata associated with the video stream (e.g., in the stream's supplemental enhancement information (SEI) and/or stream definition headers).

In the example of FIG. 1, the three independently encoded video streams 110-112 from three of the participants (associated with devices 101, 102, and 103, respectively) are combined into a single stream 114 for the fourth participant (associated with device 104) in which each frame includes image data from three corresponding frames of the independent streams, and for which the stream metadata identifies each of the regions of the combined frame corresponding to the image data from those frames as independently decodable slices or tiles of the combined frame (e.g., 116-118). That is, the metadata for each of the independent streams are used to generate metadata for the combined stream that define the frames of the independent streams as constituent slices or tiles in the frames of the combined stream. In the depicted example, the logic for accomplishing this combination is assumed to be on each client device (e.g., device 104 in FIG. 1). However, as will be described, implementations are contemplated in which the combination may be performed by logic that is located elsewhere.

The video decoder on each client device (e.g., device 104) conventionally decodes the combined video stream (e.g., according to the H.264 or HEVC standard) resulting in frames of video (e.g., 120) in which each of the other participants is represented. Because the metadata associated with each of the encoded streams is typically unencrypted, the combination may be accomplished without decryption or decoding of the constituent streams or access to DRM trust zones, making this an extremely fast operation suitable for low-latency real-time operation; whether performed by low power end point devices, or by a central host performing many simultaneous operations. As will be appreciated, low latency may be particularly important for implementations intended to support real time communication sessions among multiple, geographically distributed participants.

Note that, as illustrated in FIG. 1, the arrangement of the different slices or tiles in the combined video stream may be different than the arrangement of the corresponding image regions in the rendered video, e.g., through the use of post-decoding logic on the client device. It should also be noted that references to H.264 and HEVC in this example are not intended to be limiting. Any video codec that supports the independent encoding and decoding of different regions of an image frame may be used to combine video streams as enabled by the present disclosure. Such video codecs include, but are not limited to, AV1, VP8, and VP9, as well as future codecs that support independent encoding and decoding of different regions of an image frame, e.g., H.266. The scope of the present disclosure should therefore not be limited by reference to specific codecs.

Figure 2:
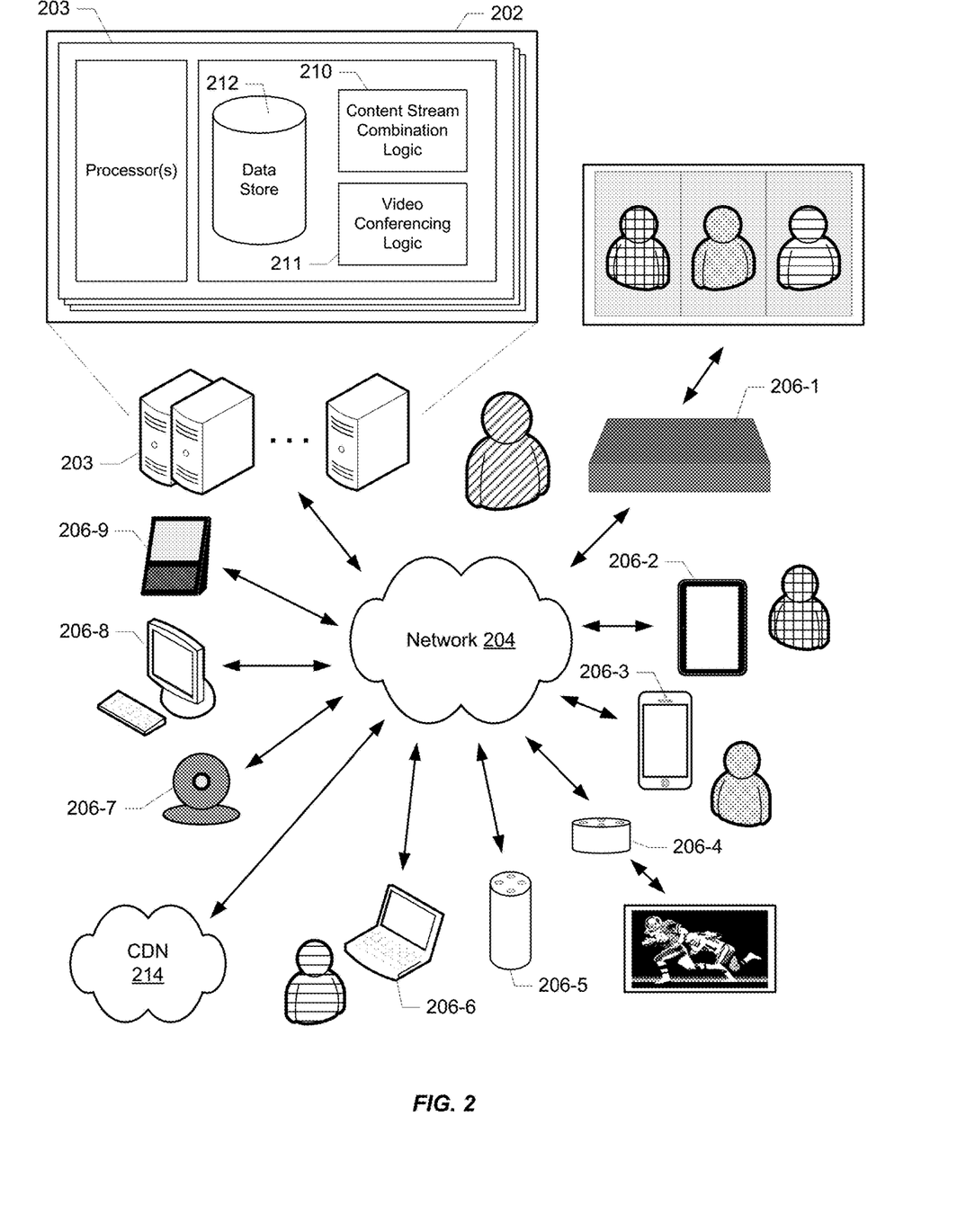
FIG. 2 depicts a computing environment in which implementations enabled by the present disclosure may be practiced.

FIG. 2 illustrates an example of a computing environment in which video streams may be transmitted via network 204 to a variety of client devices (206-1 through 206-9) and combined in accordance with the techniques described herein. As mentioned above, the combination of video streams may be done at the client devices. Alternatively, the combination of video streams may be done at any of a variety of intermediate devices in the computing environment such as, for example, a centralized host as represented by service 202 and content stream combination logic 210.

Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Some implementations enabled by the present disclosure contemplate logic resident on the client devices that is configured to combine independently encoded streams of content as described herein. Such logic might be part of an existing algorithm or module on the client device or implemented to work in conjunction with such an algorithm or module.

It should also be noted that implementations are contemplated in which, in addition to content stream combination logic 210, service 202 may include other types of logic, e.g., video conferencing logic 211, that facilitates various aspects of establishing and conducting multi-party video conference communication sessions. As another example, service 202 might include logic for managing remote monitoring systems, e.g., home or enterprise security systems in which video streams from security cameras are combined. In another example, video streams for a group of online gamers participating in an MMO environment could be combined. As will be appreciated, these are only examples of the wide variety of implementations that might employ combined video streams as enabled by the present disclosure.

In addition to providing access to video streams, service 202 may also include a variety of information related to the video content (e.g., other associated metadata and manifests in data store 212 which service 202 uses, or to which service 202 provides access). Alternatively, such information about the content, as well as the content itself may be provided and/or hosted by one or more separate platforms, e.g., CDN 214. It should be noted that, while logic 210 and 211, and data store 212 are shown as integrated with service 202, implementations are contemplated in which some or all of these operate remotely from the associated service, and/or are under the control of an independent entity. From these examples, those of skill in the art will understand the diversity of use cases to which the techniques described herein are applicable.

Figure 3:
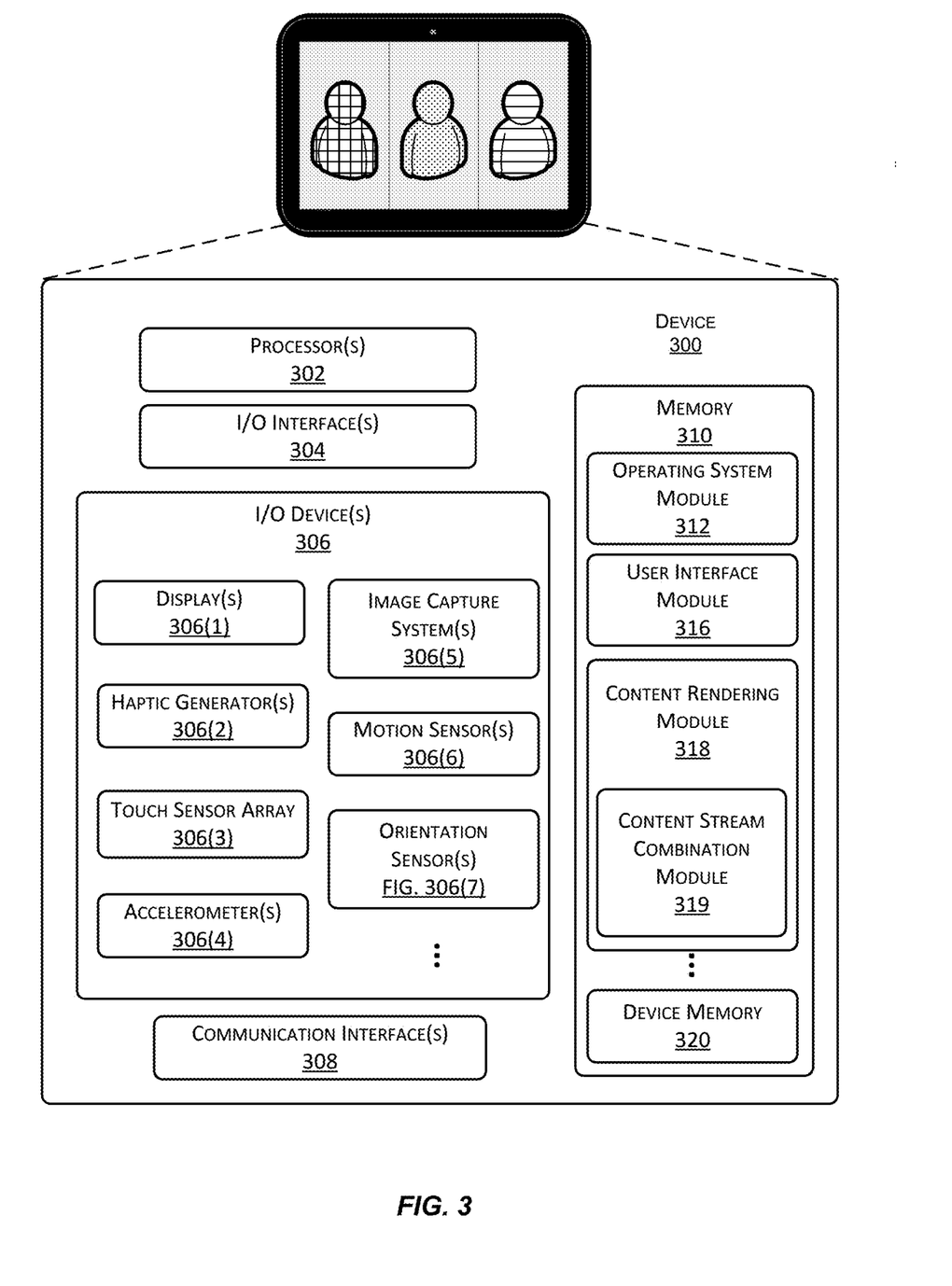
FIG. 3 depicts a client device with which implementations enabled by the present disclosure may be practiced.

A block diagram of an example of a device 300 suitable for use with various implementations is shown in FIG. 3. As mentioned above with reference to FIG. 2, device 300 may be any of a wide variety of device types. Device 300 (depicted in this example as a tablet device) includes one or more single or multi-core processors 302 configured to execute stored instructions (e.g., in device memory 320). Device 300 also includes one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300. As will be appreciated, device 300 may include or be in communication with one or more of a given type of I/O device (e.g., one or more cameras, one or more displays, one or more speakers, etc.).

Device 300 also includes one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a cellular network, a WiFi LAN, and a Bluetooth PAN. Device 300 also includes one or more buses or other internal communications hardware or software (not shown) that allow for the transfer of data and instructions between or among the various modules and components of the device.

Device 300 also includes one or more memories (e.g., memory 310). Memory 310 includes non-transitory computer-readable storage media that may be any of a wide variety of types of volatile and non-volatile storage media. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic used to combine independently encoded streams of content (represented by module 319 in FIG. 3) may be implemented in a variety of ways, e.g., in hardware, software, and/or firmware. And as mentioned, such logic may be located upstream from the client device(s) receiving a combined video stream (e.g., logic 210 of FIG. 2). It will also be understood that device 300 of FIG. 3 is merely an example of a device with which various implementations enabled by the present disclosure may be practiced, and that a wide variety of other devices types may also be used (e.g., devices 206-1 to 206-9). The scope of this disclosure should therefore not be limited by reference to device-specific details.

Figure 4:
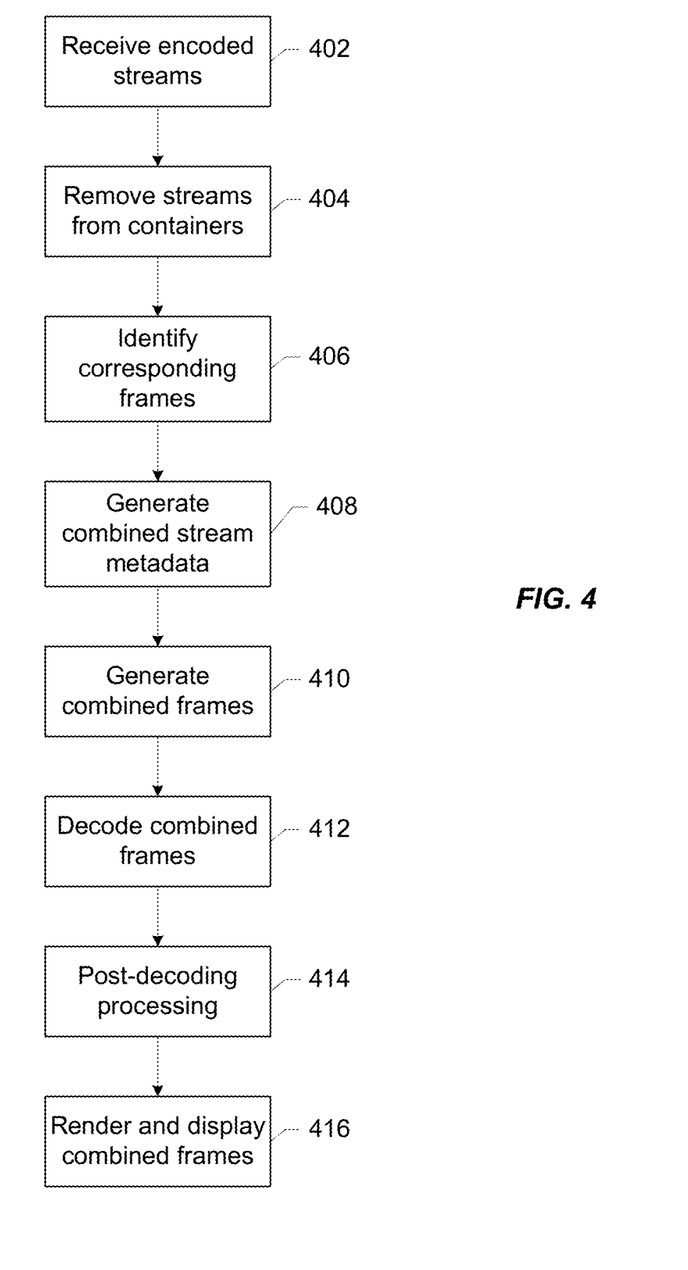
FIG. 4 is a flowchart illustrating operation of an implementation enabled by the present disclosure.

The operation of a particular implementation is described with reference to the flowchart of FIG. 4. The depicted implementation may be performed by the client device that decodes and displays the combined video stream or at another device or platform upstream from that client device. A plurality of independently encoded video streams are received via a network (402). The streams may originate from corresponding devices operating in or connected to the network. The devices might be generating their respective streams as part of, for example, a video conference in which the streams include video of participants associated with each device. Alternatively, the devices might be security cameras generating video for remote monitoring by security personnel or a homeowner.

In cases in which the streams are combined at the client device, each stream might be transmitted to the client device via a distinct communication session with each of the devices generating a video stream. Alternatively, in cases in which the streams are combined at some intermediate platform, the intermediate platform might have distinct communication sessions with each device generating a video stream, as well as with each device receiving some combination of the streams.

According to various implementations, the video streams to be combined are encoded using the same video codec (e.g., H.264 or HEVC). To promote flexibility with regard to the diversity of devices and existing codecs, implementations are contemplated in which one or more of the streams are transcoded to the common codec prior to combination of the streams. For example, if three participants in a video conference have devices that encode video using HEVC, and a fourth participant's device uses H.264, the video originating from the fourth participant's device can be transcoded from H.264 to HEVC before combination with any of the streams originating from the other participants' devices. More generally, implementations are contemplated in which most or all of the streams are transcoded to a common codec or a smaller set of codecs. In addition, implementations are contemplated in which the common codec or one or more of the smaller set of codecs may not be represented among the original streams.

And even though techniques enabled by the present disclosure contemplate enabling older or lower power devices to receive a combined content stream with a single decoder, implementations are contemplated in which the capabilities of more advanced devices may be enhanced by the techniques described herein. For example, devices that are capable of decoding multiple streams according to different codecs could simultaneously decode one combined stream according to one codec and a second combined stream according to another codec.

The encoded content streams are removed from their respective containers to get elemental streams for each (404). A container is a metafile that describes how different elements of data and metadata coexist in a computer file. For example, the encoded video data and associated metadata for a video stream might be included in an MPEG-4 Part 14 (MP4) container that is based on the more general ISO base media file format (MPEG-4 Part 12). As will be discussed, the encoded video data need not be decoded to accomplish the combination of the multiple video streams.

Corresponding frames of each of the elemental video streams are identified (406). This might be done, for example, by correlating the time stamps of the frames from each stream with a global clock reference. Such a global clock reference might be based on one or more clock references transmitted to the participating devices. For example, many smart devices receive a clock reference generated by a device service provider. In another example, the provider of the specific service for which the video streams are being combined (e.g., a video conferencing service) might provide the reference. Information about the reference for the time stamps associated with a given stream may be provided in the metadata associated with that stream. In some case, correlating the frames from the different streams might involve altering the time stamps associated with the frames of one or more of the streams and/or introducing delays into one or more of the streams.

The metadata associated with the different streams is used to generate combined stream metadata in which the image data of the corresponding frames of the different streams are identified as regions within frames of the combined video stream (408). The metadata for the individual streams are combined and modified such that the frame content each describes is redefined as corresponding to a region in a frame that includes frame content from frames of the other streams being combined. For example, in cases where the codec is H.264, each frame of an individual stream is defined as one of the slices of a frame of the combined stream. Alternatively, in cases where the codec is HEVC, each frame of an individual stream is defined as one of the tiles of a frame of the combined stream.

According to a particular class of implementations, the combined stream metadata uses each frame's SEI to define the positions of the frames of the different streams within the combined frame (e.g., coordinates, height, width, etc.). These decisions could be hard-coded for specific scenarios, based on the individual stream metadata, or based on an analysis of the individual streams, e.g., for x number of streams, determine an arbitrary order of the streams, stack them on top of each other as slices (e.g., for H.264) or construct a grid arrangement of tiles (e.g., for HEVC), and determine a resolution that is sufficient to fit the stack of slices or the grid of tiles. The SEI from the individual streams is modified as necessary to correspond to the corresponding slice or tile within the new frame. For example, the slice header and/or tile header indices of each of the individual streams are modified such that each set of indices corresponds to a particular range (e.g., a particular slice or tile) within the new indexing scheme of the combined stream.

The corresponding frames of the different streams are combined into a frame of the combined stream as defined in the combined stream metadata (410). According to various implementations, the pattern of frame types in the group-of-pictures (GOP) reference sets and/or the network abstraction layer (NAL) units of the individual streams are constrained such that only frames of the same type are combined. This constraint may be enforced by requiring that each encoder use the same reference set pattern. This will ensure that the frames being combined correspond to the same frame type, e.g., Instantaneous Decoder Refresh (IDR or I) frame, Predictive (P) frame, Reference bidirectional (B) frame, etc.

The resolution of the frames of the combined stream can be based on the resolutions of the original streams, or can be known or fixed for a given scenario. For example, four 320×240 pixel frames from the input streams can be combined to make one 640×480 pixel frame of the combined stream. Alternatively or in addition, the manner in which the frames of the different streams are combined may be determined by the capabilities of the decoder that will be decoding them. That is, the decoder should be able to handle the height and width of the combined frame as well as the stream's frame rate. In the example above, the decoder would need to be capable of decoding a 640×480 frame.

As should be appreciated from the foregoing discussion, the combination of streams does not happen at the compressed bit-stream level, but instead involves using and/or modifying the metadata associated with each stream and combining the streams into a new frame with new metadata in which the positions and arrangements of the slices or tiles are specified. This allows the operation to be done inexpensively from a computational perspective. Also, because the metadata are typically unencrypted (even for encrypted content), the operation can be done on encrypted content without having to decrypt it, and at any point in the network at which multiple streams coincide.

The combined video stream may then be provided to a decoder for decoding (412). For cases in which the combination of streams is done on a platform remote from the client device, this may involve creating a new container for the combined stream and transmitting the combined stream to the client device on which the frames of the combined stream are to be displayed. The client device may then receive and decode the combined stream conventionally according to the standard with which it was encoded. More generally, the content for the combined elementary stream may be packaged and transmitted to a particular client device in a variety of ways without departing from the scope of the present disclosure, as long as the information required to decode the combined stream, e.g., the combined stream metadata, is provided.

For client-side implementations, the combining of the streams could be implemented, for example, in the demultiplexer stage of the devices content processing infrastructure in which the contents of the individual streams have been removed from their respective containers and stored in device memory as elementary streams. The elementary streams are then combined into a new elementary stream as described above and fed to the device's decoder.

According to some implementations, post-decoding processing of the combined video frames (414) may be performed prior to rendering and displaying (416). Such post-decoding processing might include arranging the regions of the video frames corresponding to the different original streams in a way that is different than the configuration specified by the combined stream metadata. For example, for implementations using H.264, the slices of the frames of a combined stream are arranged in a vertical stack as illustrated, for example, in FIG. 1 (see the frames of combined stream 114). However, once decoded, the content/image data corresponding to the slices of a frame could be modified (e.g., rearranged, resized, cropped, etc.) resulting in an image frame in which the regions of video derived from the slices are visually arranged side-by-side in a row (see video frames 120). As will be appreciated, the content of the different portions of the frames of the combined stream may be manipulated in a variety of ways to achieve a great diversity of visual arrangements of the combined content on one or even multiple displays.

The nature of the post-decoding processing can be fixed, or it can adapt dynamically depending on various conditions or parameters. For example, based on indicators inserted in the combined stream metadata, the image data corresponding to one or more of the streams can be emphasized in the video frames as displayed. This might be useful, for example, in video conferencing to emphasize the image data for the participant currently speaking by enlarging and/or enhancing the quality of that portion of the displayed frame. As the speaker changes from one participant to another (e.g., as determined by audio levels of audio streams corresponding to the different video streams), the emphasis can shift accordingly. In another example for a security camera application, the emphasis could shift from one security camera view to another based on input from a user viewing the combined video (e.g., by selecting a specific video within a user interface.

According to some implementations, emphasis of the content corresponding to one or more of the input streams may be accomplished using the scalable video coding (SVC) features of H.264 or the scalability extension of HEVC (SHVC). These extensions of their respective codecs enable the encoding of a high-quality video bit-stream that includes one or more subset bit-streams that can be decoded with a complexity and reconstruction quality similar to that achieved using the original base codec. The subset bit-streams include a base layer and three enhancement layers that represent scalability of the encoding of the underlying content in temporal, spatial, and quality domains.

According to a particular class of implementations, the image data for each input stream can include base layer data and enhancement layer data. The enhancement layer data includes additional image data that can be used to increase the temporal resolution, the spatial resolution, or the quality level of the image represented by the base layer data. When the content for a particular input stream is to be emphasized in the display of the combined video stream on the client device, enhancement layer data may be used, for example, to support enlarging that content relative to the content corresponding to the other streams in the combined stream. The enhancement layer data used might be for increasing the temporal resolution, the spatial resolution, or the quality level of the image, or any combination of the three.

The manner in which the enhancement layer information is provided may vary. For example, enhancement layer data may be provided with each of the streams being combined, but only decoded and displayed for the stream being emphasized. Alternatively, for client-side implementations, the client may request the enhancement layer data for a given stream once it determines which stream will be emphasized in the combined stream. As another alternative, for implementations in which the combination of the streams is done on a platform remote from the client device, the logic at the remote platform can determine which enhancement layer information should be provided to each client device.

For devices that include or are in communication with multiple displays, different displays may be used to present different parts of the communication session. In one scenario, one display might feature the emphasized content of the combined stream while another might feature a combination of the remaining content of the combined stream. For example, one participant in a multi-party video conference might have one device, e.g., a tablet, that has one or more cameras capturing that participant's video as well as displaying the content associated with the current speaker, while the remaining participants are displayed in a grid on the participant's flat screen television. As the speaker changes, the portions of the combined stream displayed on the tablet and the flat screen could change correspondingly.

As will be appreciated, at least some of the video streams combined as described herein may also have an associated audio stream. A variety of approaches may be taken to present one or more of the audio streams in conjunction with a combined video stream. For example, the audio content for one of the streams can be selected for presentation to the exclusion of the audio content associated with the other streams. This could be used in the context of video conferencing to isolate and present the audio stream for the current speaker. It might be used in the surveillance/security context to provide audio for a selected video stream.

According to one implementation, each of the audio streams is included as a track in a multi-track audio stream associated with the combined video stream. A multi-track audio decoder at the client or logic associated with an audio decoder may be configured to select one or more of the tracks for presentation with the combined video stream. As with the emphasis of a particular video stream in the combined video, selection or emphasis of a particular audio track may be done based on a variety of criteria. For example, in a multi-party communication session (e.g., video conferencing), selection of an audio track may be based on which participant is currently speaking.

Various implementations described herein relate to combination of real-time or near-real-time information such as, for example, in the context of video conferencing, video surveillance, or online gaming. However, it should be noted that the techniques described herein are not so limited, and can be used to combine any set of independently encoded video streams. That is, the techniques described herein may be used to combine previously generated and/or encoded video streams into a single interface. For example, multiple active movie previews might be presented on the same screen. The user could choose one of the previews, in response to which, that stream could be emphasized. This might involve changing the position and/or increasing the size of the selected content on the screen. It might also involve selecting and presenting the corresponding audio emphasized relative to or instead of the audio associated with any of the other streams.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product, comprising one or more non-transitory computer-readable media having computer program instructions stored therein, the computer program instructions being configured such that, when executed by one or more computing devices, the computer program instructions cause the one or more computing devices to:

receive a plurality of independently encoded video streams, each received video stream having individual stream metadata associated therewith that describe frames of the received video stream;

generate combined stream metadata using the individual stream metadata, the combined stream metadata representing a combined video stream, the combined stream metadata defining a correspondence between frame content of each received video stream and one of a plurality of regions in frames of the combined video stream; and generate the combined video stream using the combined stream metadata such that the frame content of each received video stream is represented in the corresponding region of the frames of the combined video stream, wherein the combined video stream is generated without decryption or decoding of the received video streams.

2. The computer program product of claim 1, wherein each of the received video streams corresponds to one of a plurality of distinct communication sessions.

3. The computer program product of claim 1, wherein a video encoding standard to which the combined video stream conforms defines a plurality of reference frame types, and wherein the computer program instructions are configured to cause the one or more computing devices to generate the combined stream metadata such that the frame content of the received video streams in each frame of the combined video stream corresponds to a same reference frame type.

4. The computer program product of claim 1, wherein the computer program instructions are further configured to cause the one or more computing devices to:

decode the combined video stream thereby generating decoded video content; and manipulate the frame content represented in the regions of each frame of the decoded video content to have a visual arrangement different than represented in the combined stream metadata.

5. The computer program product of claim 1, wherein the combined video stream conforms to a first video encoding standard, wherein a first received video stream of the plurality of received video streams conforms to a second video encoding standard, and wherein the computer program instructions are further configured to cause the one or more computing devices to transcode the first received video stream from the second video encoding standard to the first video encoding standard.

6. The computer program product of claim 1, wherein the computer program instructions are further configured to cause the one or more computing devices to include scalability data defined by a video encoding standard with the combined video stream, the scalability data being configured to support emphasis of the frame content of one or more of the received video streams.

7. A computer-implemented method, comprising:

receiving a plurality of independently encoded video streams, each received video stream having individual stream metadata associated therewith that describe frames of the received video stream;

generating combined stream metadata using the individual stream metadata, the combined stream metadata representing a combined video stream, the combined stream metadata defining a correspondence between frame content of each received video stream and one of a plurality of regions in frames of the combined video stream; and generating the combined video stream using the combined stream metadata such that the frame content of each received video stream is represented in the corresponding region of the frames of the combined video stream, wherein the combined video stream is generated without decryption or decoding of the received video streams.

8. The method of claim 7, wherein each of the received video streams corresponds to one of a plurality of distinct communication sessions.

9. The method of claim 7, wherein a video encoding standard to which the combined video stream conforms defines a plurality of reference frame types, and wherein generating the combined stream metadata occurs such that the frame content of the received video streams in each frame of the combined video stream corresponds to a same reference frame type.

10. The method of claim 7, further comprising:
decoding the combined video stream thereby generating decoded video content; and
manipulating the frame content represented in the regions of each frame of the decoded video content to have a visual arrangement different than represented in the combined stream metadata.

11. The method of claim 7, wherein the combined video stream conforms to a first video encoding standard, wherein a first received video stream of the plurality of received video streams conforms to a second video encoding standard, and wherein the method further comprises transcoding the first received video stream from the second video encoding standard to the first video encoding standard.

12. The method of claim 7, further comprising including scalability data defined by a video encoding standard with the combined video stream, the scalability data being configured to support emphasis of the frame content of one or more of the received video streams.

13. A computing device, comprising:
a camera;
a display;
memory; and
one or more processors configured to:
initiate connection to a multi-party communication session including a plurality of participants;
generate, using the camera, first video content of a first participant associated with the computing device;
encode the first video content;
transmit a transmitted video stream including the encoded first video content for presentation on each of a plurality of remote devices associated with the other participants;
receive a plurality of independently encoded video streams associated with the communication session, each received video stream corresponding to one of the other participants and having individual stream metadata associated therewith that describe frames of the received video stream;
generate combined stream metadata using the individual stream metadata, the combined stream metadata representing a combined video stream, the combined stream metadata defining a correspondence between frame content of each received video stream and one of a plurality of regions in frames of the combined video stream;
generate the combined video stream using the combined stream metadata such that the frame content of each received video stream is represented in the corresponding region of the frames of the combined video stream, wherein the combined video stream is generated without decryption or decoding of the received video streams;
decode the combined video stream to generate decoded video content; and
present the decoded video content on the display.

14. The device of claim 13, wherein a video encoding standard to which the combined video stream conforms defines a plurality of reference frame types, and wherein the one or more processors are configured to generate the combined stream metadata such that the frame content of the received video streams in each frame of the combined video stream corresponds to a same reference frame type.

15. The device of claim 13, wherein the one or more processors are further configured to:
decode the combined video stream thereby generating decoded video content; and
manipulate the frame content represented in the regions of each frame of the decoded video content to have a visual arrangement different than represented in the combined stream metadata.

16. The device of claim 13, wherein the combined video stream conforms to a first video encoding standard, wherein a first received video stream of the plurality of received video streams conforms to a second video encoding standard, and wherein the one or more processors are further configured to transcode the first received video stream from the second video encoding standard to the first video encoding standard.

17. The device of claim 13, wherein the one or more processors are further configured to generate the combined stream metadata using metadata associated with the encoded first video content such that a correspondence between frame content of the encoded first video content and one of the regions in the frames of the combined video stream is defined.

* * * * *